US005662880A

United States Patent [19]

Rendall et al.

[11] Patent Number: 5,662,880

[45] Date of Patent: Sep. 2, 1997

[54] METHOD FOR PRODUCING CATALYST-GRADE ALUMINA FROM ALUMINUM SULPHATE

[75] Inventors: John S. Rendall; Massoud Ahghar; Stephen J. Lane, all of Albuquerque, N. Mex.

[73] Assignee: Solv-Ex Corporation, Albuquerque, N. Mex.

[21] Appl. No.: 635,322

[22] Filed: Apr. 19, 1996

[51] Int. Cl.[6] .............................. C01F 7/02; C22B 13/00

[52] U.S. Cl. .............................. 423/628; 23/305 A

[58] Field of Search .............................. 423/628; 23/305 A

[56] References Cited

U.S. PATENT DOCUMENTS

| | | | |
|---|---|---|---|
| 2,970,892 | 2/1961 | Kirshenbaum et al. | 23/305 A X |
| 3,459,681 | 8/1969 | Innes et al. | 423/628 X |
| 4,171,205 | 10/1979 | Lamérant et al. | 23/305 A X |
| 4,276,052 | 6/1981 | Schmidt et al. | 23/305 A X |
| 4,394,368 | 7/1983 | Shanks | 23/305 A X |

*Primary Examiner*—Donald R. Valentine
*Attorney, Agent, or Firm*—Thomas E. Schatzel; Law Offices of Thomas E. Schatzel A Prof. Corporation

[57] ABSTRACT

A method of making activated alumina includes beginning with a leach liquor of potassium and aluminum sulphates that is subjected to a surface-cooled crystallizer with a heat-exchanger input temperature of 160° F. and a surface-chilled temperature of 60° F. to 80° F. Crystals of aluminum sulphate are precipitated and recrystalized by evaporation in a vacuum and at an elevated temperature. Purified crystals of aluminum sulphate are then dried at 50°–60° C. The dried aluminum sulphate crystals are then dehydrated at 400°–450° C. after a rise rate of 10°–20° C. per minute to drive off most of the water. A roasting and recalcination step at 900° C.–950° C. after a rise rate of 10°–20° C. per minute is used drive off the sulphate. The remaining alumina is useful as a high-grade catalyst.

7 Claims, 1 Drawing Sheet

METHOD FOR PRODUCING CATALYST-GRADE ALUMINA FROM ALUMINUM SULPHATE

BACKGROUND OF THE INVENTION

1. Field of the Invention

The invention relates generally to inorganic chemistry and specifically to methods for producing high-grade alumina for catalytic applications.

2. Description of the Prior Art

Aluminum oxide (alumina) occurs abundantly in nature, most often as impure hydroxides, e.g., as in bauxites and laterites. Major chemical products are made by purifying such natural ores. Most bauxite is refined by the Bayer process which uses caustic additions to remove impurities and to produce a nominal 99.5% $Al_2O_3$ product with $Na_2O$ as its dominant impurity. About 85% of alumina is used in the production of aluminum metal. The rest is consumed in other applications, including activated aluminas.

Activated aluminas are widely used in adsorption and catalysis where their relatively large surface areas, pore structure and surface chemistry play important roles. Hydrated aluminas, those with water, are dehydrated by controlled heating. The oldest commercial form, still in wide use, is made from Bayer alpha-trihydrate. Activated bauxites have similar properties to the activated alumina from the Bayer alpha-trihydrate. They are obtained by thermal activation of bauxite containing alumina in the form of gibbsite. Another type of activated alumina is obtained by very rapid activation of Bayer hydrate at 673°–1073° K. The outcome is essentially amorphous alumina with a weak pattern of $\gamma/\eta$-alumina. Alumina gels also serve as starting points for the manufacture of activated aluminas. These gels are prepared from solutions of $Al_2(SO_4)_3$ and produce corresponding by-product salts that precipitate out after being washed.

Activated aluminas find important applications as catalysts. Sometimes the $Na_2O$ content is reduced to under one-tenth of one percent by washing in acidified water. Preparations using refined Al or an alkoxide of Al can be used to make an extremely pure activated alumina gel. But the manufacturing costs of these high-purity aluminas are very high.

The catalytic reactivity of activated alumina is represented by its theoretical number of available active sites. The surfaces contain hydroxyl groups, oxides and aluminum ions. The three basic catalytic sites also have many possible logistical combinations.

A major catalytic application of activated alumina is that of Claus converters, which recover sulfur (S) from $H_2S$ that has been extracted from sour natural gas or refinery off-gas. The dehydration of alcohol is one of the oldest catalytic reactions. Activated alumina can initiate synthesis in which water may be the reactant or the product. Bulk $MoO_3$ is industrially reduced to metal at 773° K. with $H_2$, but when supported on activated alumina, the reaction proceeds only to $MoO_2$. One of the largest modern-day uses of activated alumina is that of a catalyst support for catalytic mufflers on automobiles. The catalyst is a blend of Pt and Pd metals supported on pellets or a monolithic form. The Pt-Pd is used as an oxidation catalyst to convert hydrocarbons and CO to $CO_2$ and $H_2O$.

Poisons to the active sites of activated alumina catalysts were thought by most to comprise the naturally occurring impurities of potassium (K) and sodium (Na). The present inventors have discovered that potassium (K) is not necessarily a catalytic poison, especially when present in only small residual quantities.

SUMMARY OF THE PRESENT INVENTION

It is therefore an object of the present invention to provide a process for making catalyst-grade alumina from an aluminum sulphate.

It is a further object of the present invention to provide a process for making high-grade activated alumina at economic prices.

Briefly, in a preferred method embodiment of the present invention, a leach liquor of potassium and aluminum sulphates is subjected to a surface-cooled crystallizer with a heat-exchanger input temperature of 160° F. and a surface-chilled temperature of 60° F. Crystals of aluminum sulphate are precipitated and recrystalized by evaporation in a vacuum and at an elevated temperature. Purified crystals of aluminum sulphate are then dried at 50°–60° C. to drive off most of the water. The dried aluminum sulphate crystals are then dehydrated at 400°–450° C. after a rise rate of 10°–20° C. per minute. A roasting and recalcination step at 900° C.–950° C. after a rise rate of 10°–20° C. per minute is used to drive off the sulphate. The remaining alumina is useful as a high-grade catalyst.

An advantage of the present invention is that a method is provided for making activated alumina that has a catalytic activity in the range of $1.3\times10^{-6}$ to $4.9\times10^{-6}$ mole/gm/s at 175° C.

A further advantage of the present invention is that a method is provided for making alumina inexpensively.

Another advantage of the present invention is that a method is provided for producing fine-particles of $Al_2O_3$ that have surface areas exceeding Brunauer-Emmett-Teller (BET) surface area data of 120 $m^2/g$ and have highly active acid sites for catalyst use.

These and other objects and advantages of the present invention will no doubt become obvious to those of ordinary skill in the art after having read the following detailed description of the preferred embodiments that are illustrated in the various drawing figures.

IN THE DRAWINGS

FIG. 1 is a diagram of a method for producing and using catalyst-grade alumina in a process embodiment of the present invention.

DETAILED DESCRIPTION OF THE PREFERRED EMBODIMENTS

Figure 1:
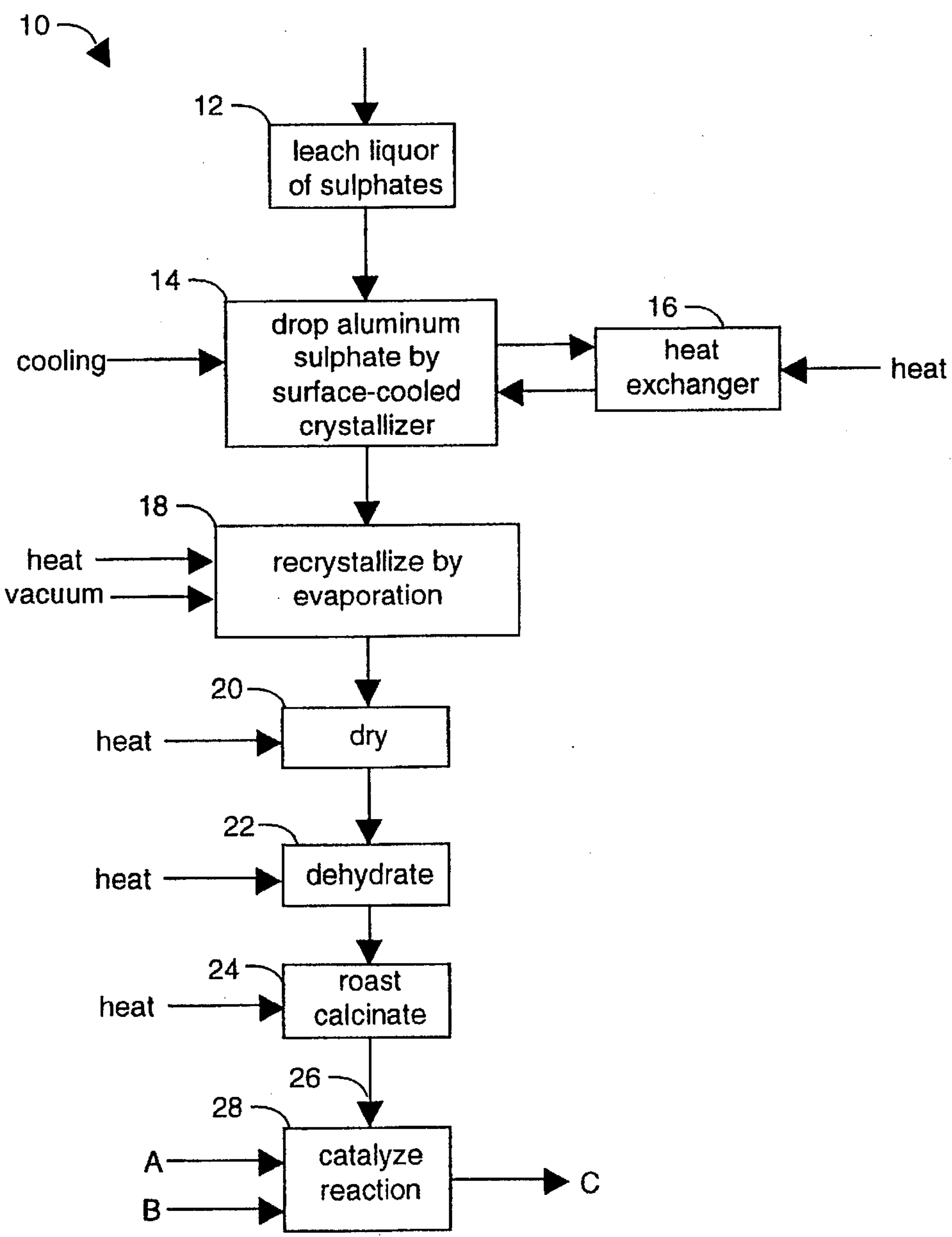

FIG. 1 illustrates a process embodiment of the present invention for making catalyst-grade alumina, the process referred to herein by the general reference numeral 10. For example, catalyst-grade alumina $Al_2O_3$ comprises fine-particles of $Al_2O_3$ that have surface areas exceeding Brunauer-Emmett-Teller (BET) surface area data of 120 $m^2/g$ and have highly active acid sites for catalyst use. The particles sizes are generally in the range of 30–150 microns and exceed 99% purity.

The process 10 comprises starting with a double salt leach liquor 12 of $Al_2(SO_4)_3+K_2SO_4$ and alternatively including iron sulphate $Fe_2SO_4$ and other sulphates. These are introduced to a surface-cooled crystallizer 14 that precipitates crystals of aluminum sulphate $Al_2(SO_4)_3\ 18H_2O$. The leach liquor is pumped through a heat exchanger 16 that keeps an internal temperature of approximately 160° F. The surface temperature of the surface-cooled crystallizer 14 is maintained at approximately 60° F. to 80° F. For example, the surface-cooled crystallizer 14 may comprise a four to six foot diameter twelve foot high stainless steel tank with a system of chilling pipes that circuit the outside surface.

The surface-cooled crystallizer 14 promotes a supersaturated concentration that causes relatively large and very pure crystals of aluminum sulphate $Al_2(SO_4)_3$ $18H_2O$ to drop out. A temperature gradient within the leach liquor is contrived thereby to promote such crystal formation. The aluminum sulphate $Al_2(SO_4)_3$ $18H_2O$ is recrystallized in a step 18 to increase the concentration. For example, a vacuum of twenty inches of mercury and heat are combined to evaporate the water and increase the concentration enough to drop crystals of aluminum sulphate $Al_2(SO_4)_3$ $18H_2O$. The these crystals are subjected to surface drying in a step 20 that drives out all but 5% of the water by increasing the temperature to 50°–60° C.

A dehydration step 22 removes substantially all the remaining moisture by raising the temperature to 400°–450° C. at a rise rate of 10°–20° C. per minute. This is followed by a roast/calcination step 24 wherein the temperature is increased to 900°–950° C. at a rise rate of 10°–20° C. per minute to drive off the sulphate and to yield alumina. From this is produced a catalyst-grade alumina $Al_2O_3$ 26 (delta and gamma exceeding 95%). Such catalyst-grade alumina 26 may then be used in a step 28 to catalyze a chemical reaction between a reagent A and a reagent B to produce a product C. The use of alumina as a catalyst is well-known and the particular combination used for elements A, B, and C used in step 28 are numerous and conventional. The present invention is unusual in the activity level of the alumina 26 used in the step 28 that resulted from the previous steps 12–24.

Alternatively, the step of roasting and calcination may be followed by a wash to remove the sulphate and then the alumina left behind the wash is dehydrated.

The particular temperatures and rise rates recited here are believed to be critical to the production of alumina that has the particular catalyst characteristics mentioned herein.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for producing activated alumina suitable for use as a catalyst, comprising the steps of:

crystallizing a leach liquor of potassium and aluminum sulphates in a surface-cooled crystallizer to precipitate crystals of aluminum sulphate;

recrystalizing said precipitated crystals of aluminum sulphate to improve their purity by evaporation in a vacuum and at an elevated temperature to yield a quantity of purified crystals of aluminum sulphate;

drying said purified crystals of aluminum sulphate to drive off a quantity of water to yield a quantity of dried aluminum sulphate crystals;

dehydrating said dried aluminum sulphate crystals to yield a quantity of dehydrated aluminum sulphate crystals; and roasting and recalcinating said dehydrated aluminum sulphate crystals until a sulphate has been separated out and a remainder comprises only a high-grade catalyst alumina.

2. The method of claim 1, wherein:

the step of crystallizing includes the use of a surface-cooled crystallizer with a heat-exchanger input temperature of approximately 160° F. and a surface-chilled temperature of approximately 60° F. to 80° F.

3. The method of claim 1, wherein:

the step of drying said purified crystals of aluminum sulphate includes drying at a temperature of approximately 50°–60° C. to drive off 5% of the water.

4. The method of claim 1, wherein:

the step of dehydrating the dried aluminum sulphate crystals includes dehydrating at a temperature of approximately 400°–450° C. after a rise rate of 10°–20° C. per minute.

5. The method of claim 1, wherein:

the step of roasting and recalcinating the dehydrated aluminum sulphate crystals includes a rising to a temperature of approximately 900° C.–950° C. after a rise of 10°–20° C. per minute.

6. The method of claim 1, further comprising the step of:

catalyzing the chemical reaction of two reagents with said alumina from the step of roasting and recalcinating the dehydrated aluminum sulphate crystals.

7. The method of claim 1, wherein:

the step of roasting and calcination is followed by a wash to remove the sulphate wherein the alumina left behind said wash is dehydrated.

* * * * *